July 2, 1957

J. R. BARBER ET AL 2,797,847

SPREADER FOR FERTILIZER AND THE LIKE

Filed April 4, 1955

INVENTOR.
James R. Barber
Jesse Barber
BY
Atty.

July 2, 1957  J. R. BARBER ET AL  2,797,847
SPREADER FOR FERTILIZER AND THE LIKE
Filed April 4, 1955  6 Sheets-Sheet 2

INVENTOR.
James R. Barber
Jesse Barber
BY
Atty.

July 2, 1957  J. R. BARBER ET AL  2,797,847
SPREADER FOR FERTILIZER AND THE LIKE
Filed April 4, 1955  6 Sheets-Sheet 3

INVENTOR.
Jesse Barber
James R. Barber
BY
Atty.

INVENTOR.
James R. Barber
Jesse Barber
BY
Atty.

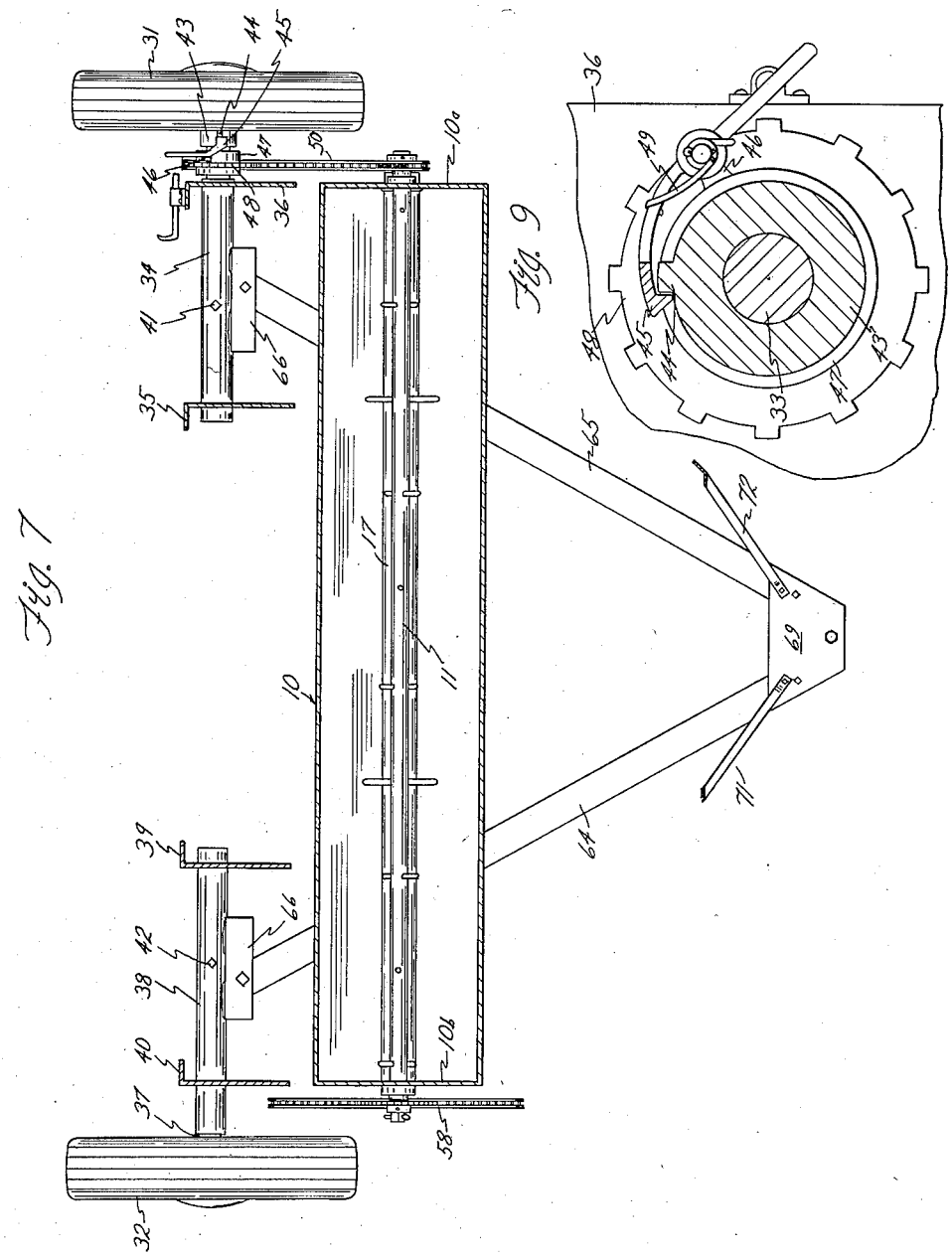

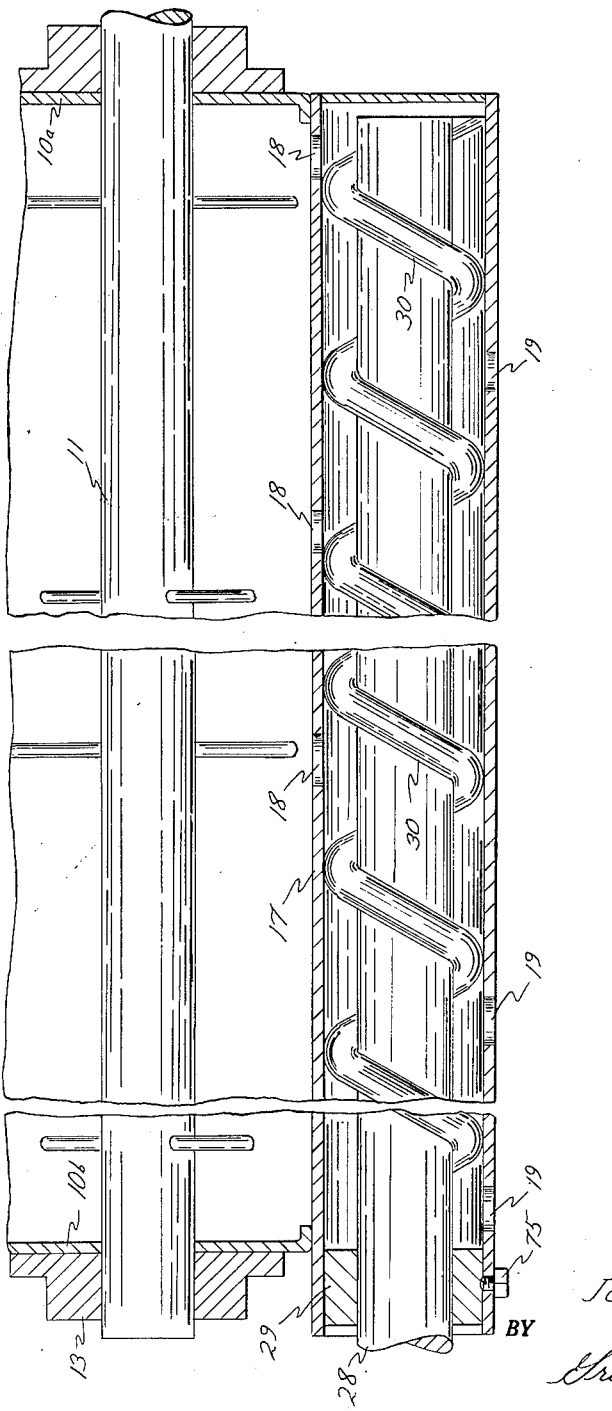

United States Patent Office 2,797,847
Patented July 2, 1957

2,797,847

SPREADER FOR FERTILIZER AND THE LIKE

James R. Barber and Jesse Barber, Spokane, Wash.

Application April 4, 1955, Serial No. 498,937

4 Claims. (Cl. 222—177)

The present invention relates to a spreader for fertilizer and the like. It is the principal purpose of this invention to provide a spreader for dry material such as the granular type fertilizers, lime, gypsum, etc., which is readily regulatable to spread a desired amount of material without overruning when it is stopped, and which is so constructed that the distributing means can be removed from the hopper and taken apart for cleaning with a minimum of effort.

It is also a purpose of this invention to provide a hopper for granular material, which may have an agitator therein, with a separable bottom piece which comprises a tube with top and bottom openings staggered along its length, a rod within the tube and a small rod wound spirally around the first named rod whereby to provide a narrow feeding space between the first named rod and the tube, together with flanges on the tube that can be clamped to the bottom of the hopper.

The nature and advantages of this invention will be more fully explained in the following description and illustrated in the accompanying drawings wherein a preferred form of the invention is shown. The drawings and description, however, are illustrative only and are not intended to limit the invention except insofar as it is limited by the claims.

In the drawings:

Figure 7 is a plan sectional view taken on the line 7—7 of Figure 1;

Figure 8 is an enlarged sectional view taken on the line 8—8 of Figure 3; and

Figure 9 is an enlarged fragmentary sectional view taken on the line 9—9 of Figure 7 with the sprocket chain left off.

In the spreading of granular materials and particularly the fine relatively high concentration fertilizers now used, it is a difficult problem to obtain uniform spreading of the material on the ground with adequate flow, in a simple machine which can be changed from one type of material to another and cleaned. For example, it is desirable from the farmer's standpoint to have a spreader or distributor which on one occasion can be used to spread normal fertilizers containing basically the nitrogen, phosphate and potash materials with no added insecticides, weedicides or other treating agent. On another occasion, it is desirable from the farmer's standpoint to use the spreader for distributing one of the treating agents. After using one of the treating agents, the spreader must be cleaned thoroughly and its life will be greatly lengthened if it is cleaned after spreading any type of fertilizer because of the corrosion that may result in leaving the fertilizer material in the active spreader parts.

Figure 1:
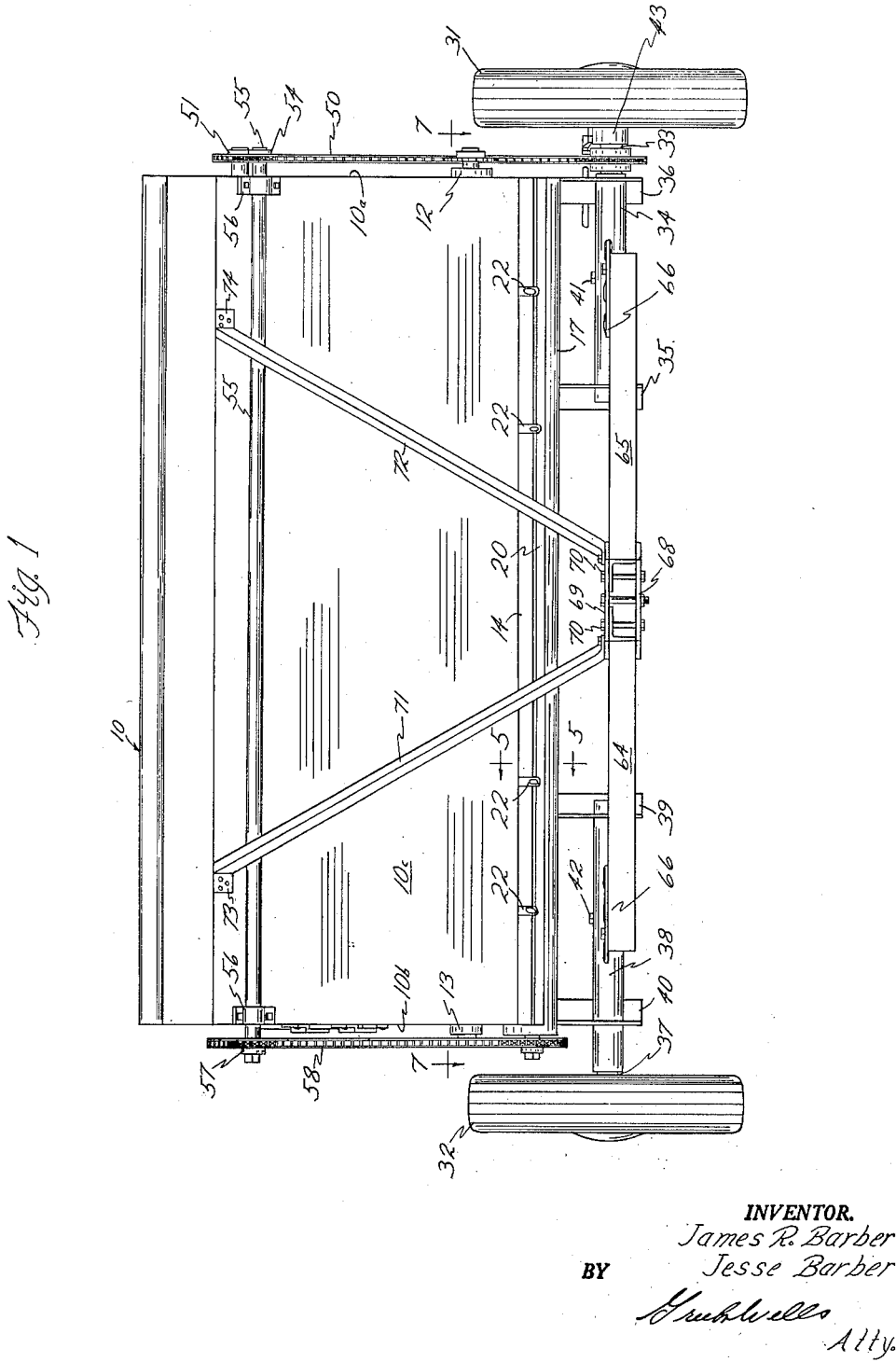
Figure 1 is a front view of a spreader for fertilizer embodying the invention.
Figure 2:
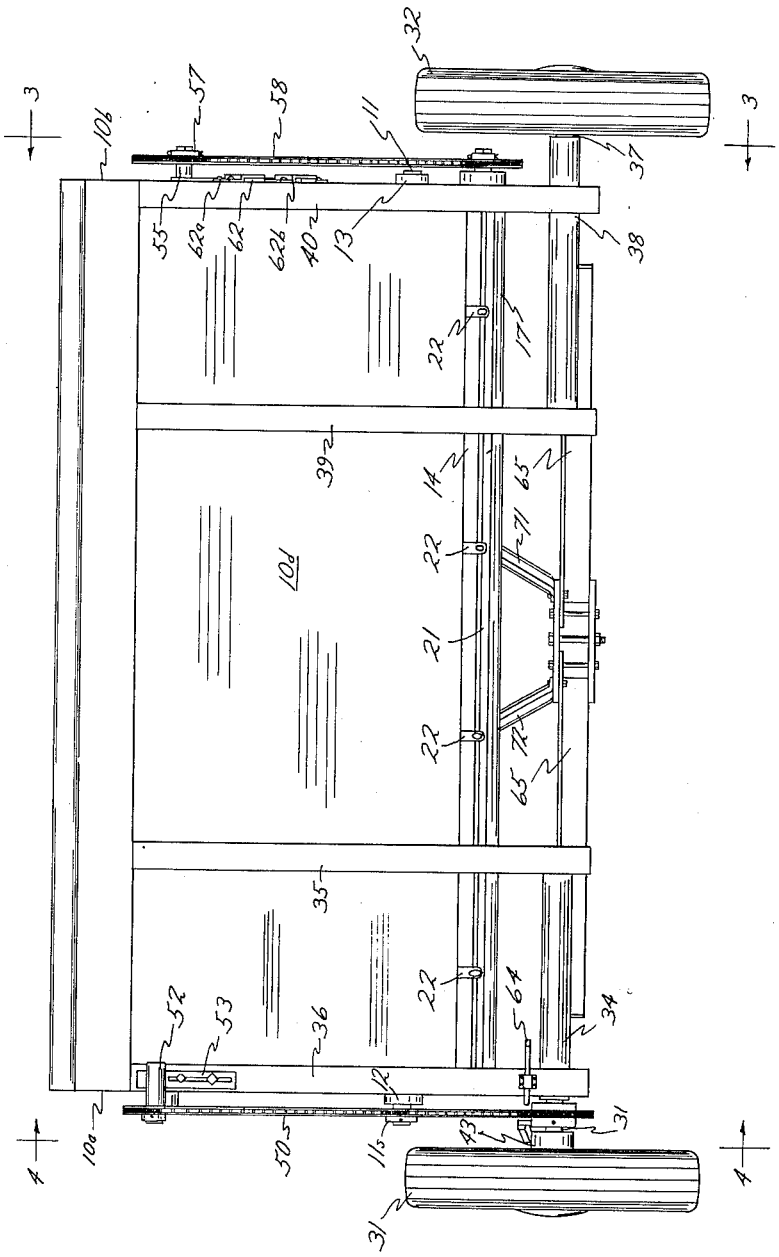
Figure 2 is a rear view of the spreader.
Figure 3:
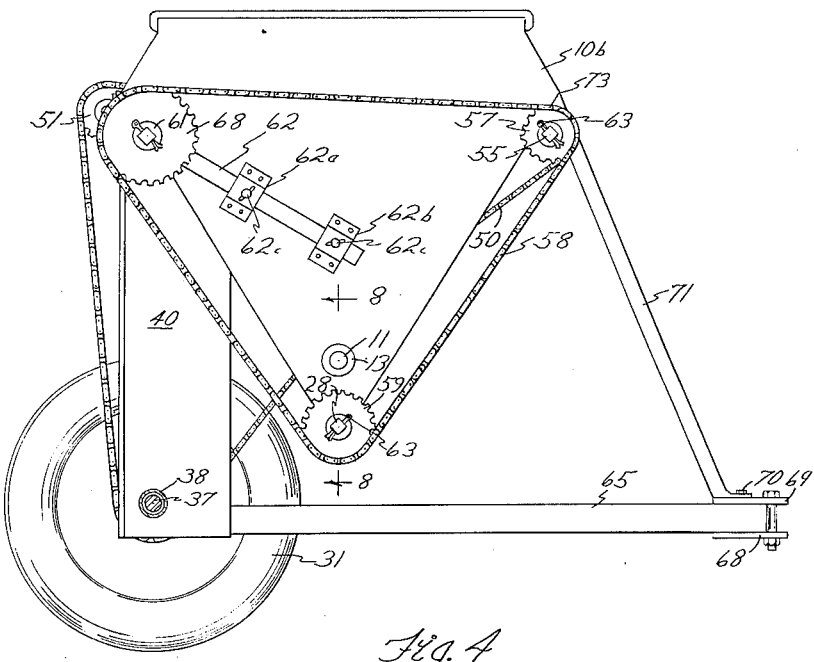
Figure 3 is an end view showing the right hand end of the machine from line 3—3 as seen in Figure 2.
Figure 4:
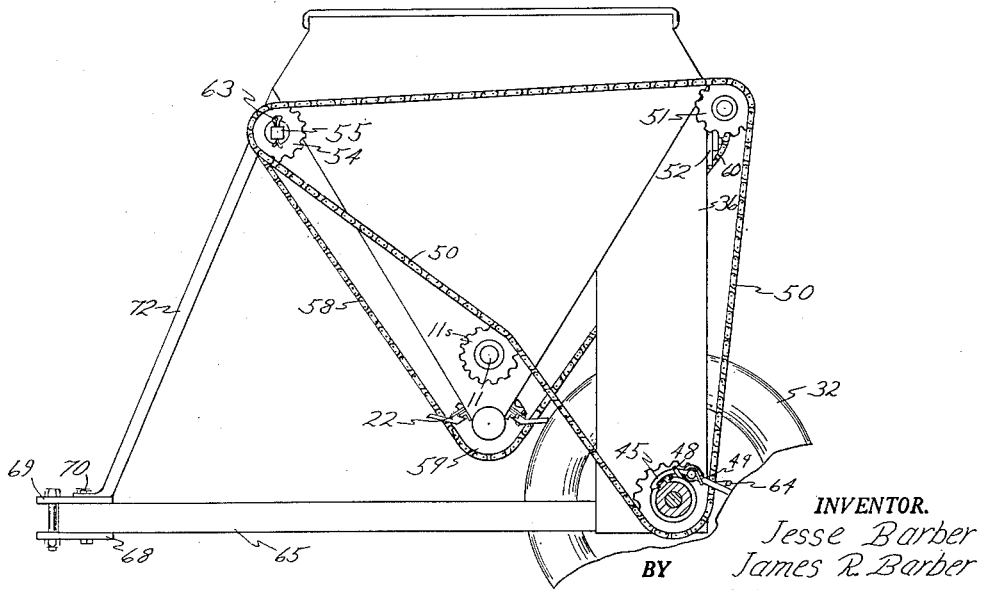
Figure 4 is an end view showing the left hand end of the spreader from line 4—4 as viewed in Figure 2.
Figure 5:
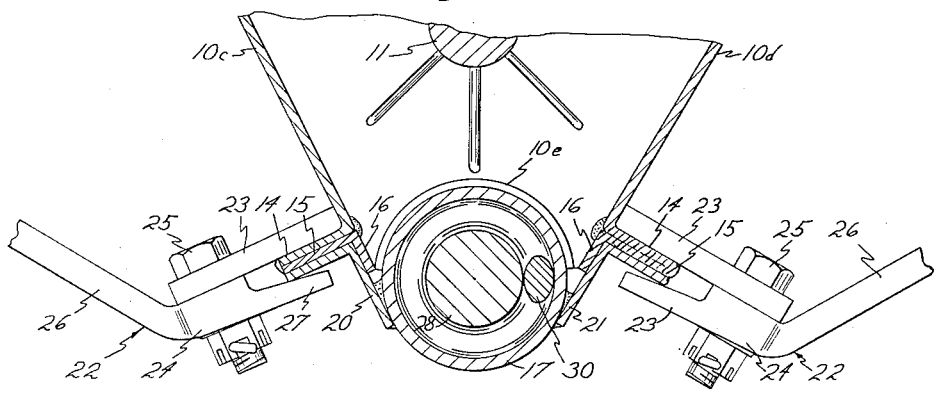
Figure 5 is an enlarged sectional view taken on the line 5—5 of Figure 1.
Figure 6:
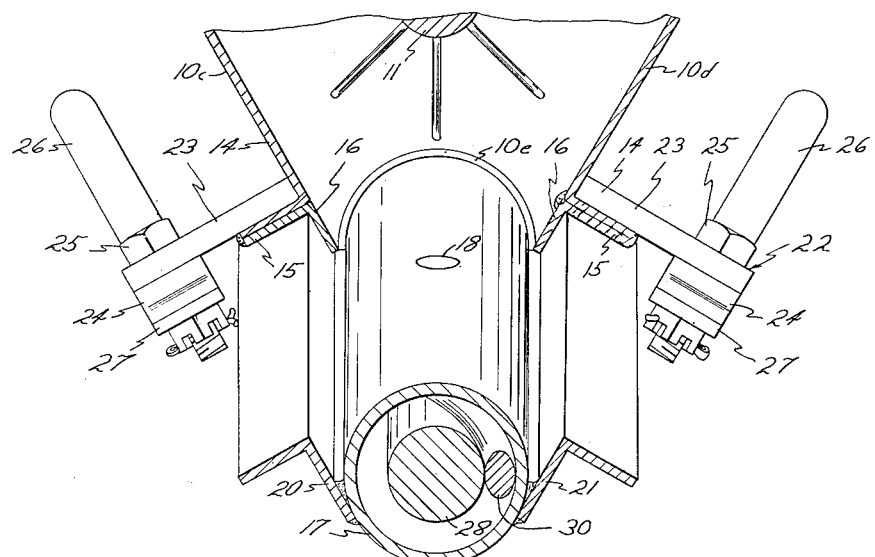
Figure 6 is a view like Figure 5 but showing the feed tube lowered from the hopper.

The spreader of the present invention embodies an elongated hopper 10 which is open throughout its interior with downwardly converging side walls providing a long narrow opening at the hopper bottom so that it may be flushed out or brushed out and easily cleaned. The hopper has an agitator shaft 11 extending through it from end to end and mounted by bearings 12 and 13 at the ends 10a and 10b of the hopper. The hopper side walls 10c and 10d are preferably formed of sheet metal and bent to the proper shape. The lower edges of the sides 10c and 10d are provided with flanges 14 which are turned out and the flanges are reenforced by L-shaped strips 15 throughout their length. The strips may be either separate strips welded to the flanges 14 as shown at the left side in Figure 5 or formed integrally with the flanges 14 by folding the material of the side walls 10c and 10d as shown at the right side in Figure 5. Either construction provides a ledge 14—15 extending outwardly at right angles to the side wall 10c or 10d and a downwardly extending flange 16 below the ledge.

The improved spreader mechanism comprises a tube 17 which extends the length of the hopper 10 and which is closed at one end. This tube has relatively large openings 18 in the top thereof and similar openings 19 along the bottom thereof, the openings 19 being spaced lengthwise of the tube from the opening 18 a distance which is greater than the internal diameter of the tube 17. The tube 17 has two side flanges 20 and 21 secured to it between the top and bottom thereof. Each of the members 20 and 21, as shown in cross section in Figure 5 has one portion secured to the tube 17 at right angles to another portion which fits against the downward face of the strip 15. The members 20 and 21 can be made of angle iron of standard dimensions. The tube 17 may be a standard size of pipe. The hopper ends 10a and 10b are cut out and flanged as indicated at 10e to fit the tube 17.

In order to hold the tube 17 in position to close the bottom of the hopper 10, a plurality of clamping devices 22 are provided. These clamping devices comprise bars 23 that are welded to the flanges 14. Levers 24 are pivotally mounted on the bars by means of bolts 25. These levers 24 have handles 26 and latching fingers 27 thereon. The fingers 27 are at right angles to the handles 26 and are tapered as shown so that they can be wedged against the members 20 and 21 to force them tightly up against the strips 15.

The tube 17 contains a shaft 28 which extends the length of the tube 17 and is rotatable in the tube 17. A bearing 29 is removably mounted in the end of the tube 17 at the end 10b of the hopper 10. The shaft 28 has a round rod 30 wound spirally around it from end to end and tack welded or otherwise secured to the shaft. The rod 30 is wound so as to provide at least a complete convolution of the rod 30 between each top opening 18 of the tube 17 and the adjacent bottom opening 19. The function of the rod 30 is to move material entering the openings 18 endwise of the tube 17 to the next opening 19, forcing the material out at a steady measured rate which will depend upon the rate on which the shaft 28 is rotated. As an example of the construction which has been found necessary to provide adequate feeding of the material without any danger of material flowing from one opening 18 to an opening 19 uncontrolled, there should be a turn of the rod 30 between an inlet opening 18 and an outlet opening 19, and the diameter of the shaft 28 should be at least three times the diameter of the rod 30 which is wound about it. A very smooth feeding apparatus can be obtained by using this relation in a tube whose inside diameter is just sufficient to provide ready rotation of the shaft 28 and its rod 30.

Referring now to the drive mechanisms for the shafts 11 and 28, the drive is obtained from one of the wheels 31—32. As shown in the drawings, the wheel 31 is mounted on an axle 33 for rotation. The axle 33 is carried in a tube 34 which in turn is mounted in two brackets 35 and 36 that extend down from the hopper 10 at the rear of the machine. The wheel 32 is journalled for rotation on an axle 37 that is mounted in a tube 38 carried by brackets 39 and 40 at the rear of the hopper 10. The wheel 31 in the present instance furnishes the drive power for the shafts 11 and 28. The axles 33 and 37 are removably secured in their respective tubes 34 and 38 by bolts which are indicated at 41 and 42. The wheel 31 has a hub portion 43 provided with a tooth 44 which is engaged by a pawl 45. The pawl 45 is pivoted on a lug 46 that is provided on the hub 47 of a sprocket wheel 48. A spring 49 urges the pawl 45 into engagement with the tooth 44. The sprocket wheel 48 drives a sprocket chain 50 which extends over a tightener sprocket wheel 51 that is journalled on a stub shaft 52. The shaft 52 is fixed to and adjustably mounted by a plate 53 on the bracket 36. The agitator shaft 11 extends through the end of the adjacent hopper 10 and is mounted there by the bearing 12. The shaft 11 has a sprocket wheel 11s fixed thereto which is engaged by the chain 50 so as to rotate the shaft 11. The chain 50 drives a sprocket wheel 54 that is mounted on a shaft 55 at the front side of the hopper 10. This shaft 55 is rotatably journalled in bearings 56 carried by the hopper 10, and extends to the other end of the hopper 10. At the other end of the hopper 10, the shaft 55 has a sprocket wheel 57 fixed thereto which drives a sprocket chain 58. A sprocket wheel 59 is removably mounted on the end of the shaft 28 and the sprocket chain 58 goes around the sprocket wheel 59. A third sprocket wheel 60 is mounted on a stub shaft 61. This shaft 61 is rotatably mounted on a bar 62 which is mounted on the adjacent end 10b of the hopper 10 so that it can be adjusted endwise in two brackets 62a and 62b and locked in place by set screws 62c.

The three sprocket wheels 57, 59 and 60 and the sprocket wheel 54 are mounted in such a manner as to be easily removed and interchanged. Each sprocket wheel slides on the squared end of its shaft and is nonrotatably keyed to the shaft by a removable pin 63 which can be readily taken out. In order to change the rate of feeding material, it is only necessary to change the speed ratio between the rotation of the wheel 31 and the rotation of the shaft 28. The plate 53 provides adjustment of the chain tightening sprocket wheel 51 so that if the sprocket wheel 54 has a smaller or larger wheel substituted for it, the plate 53 can be adjusted to keep the sprocket chain 50 tight. This adjustment provides the first or main speed ratio change between the wheel 31 and the shaft 55. Using a bigger wheel 54 gives a slower speed of the shaft 55 relative to the wheel 31. Sprocket wheels 57 and 59 can be interchanged with other wheels of different size to give finer adjustments in speed of the shaft 28 and thus provide a wide range of rate of feed of the material through the tube 17. It will be appreciated that the rate of feed of the material depends entirely upon the rotation rate of the shaft 28 with respect to the travel of the machine over the field which is measured by rotation of the wheel 31.

When a corner is being turned and no feed is desired, or if for any other reason the feed should be stopped, a clutch bar 64 which is slidably mounted on the bracket 36 is moved into the path of the pawl 45 so as to hold it out of the path of the tooth 44 and permit the wheel 31 to rotate independently of the sprocket wheel 48.

The brackets 35, 36, 39 and 40 are secured on the tubes 34 and 38 which are also the means for attaching a tow beam to the machine. This tow beam consists of two angle iron members 65 which are connected to plates 66 on the tubes 34 and 38. The members 65 are connected together at their front ends by plates 68 and 69 and bolts 70. Two braces 71 and 72 extend upwardly and rearwardly from the plate 69 and are secured to the hopper 10 at 73 and 74. It will be noted that the tow beam members 65 extend forwardly beneath the tube 17 and the bottom of the hopper 10, since the tubes 34 and 38 that mount the axles 33 and 37 for the wheels 31 and 32 are behind the hopper bottom opening. The tow beam members 65 provide a support for the tube 17 whenever it is dropped from the hopper for cleaning purposes. When the clamping devices 22 are released and the sprocket wheel 59 is removed from the shaft 28, the tube 17 and its shaft 28 will drop down on the members 65 so as to leave the bottom of the hopper wide open for cleaning. The shaft 28 and its rod 30 can likewise be withdrawn from the tube 17 endwise by loosening set screws 75 that hold the bearing 29 in place. It is thus possible to clean the active parts with a minimum of difficulty.

It is believed that the nature and advantages of the invention will be clear from the foregoing description.

Having thus described the invention, we claim:

1. A spreader of the character described comprising a supporting vehicle, a hopper thereon, said hopper having downwardly converging side walls providing a long narrow opening at the hopper bottom, a dispensing tube having side flanges thereon engaging said side walls, said tube and flanges closing said opening, means removably securing said side flanges to said side walls, a shaft in said tube, a rod wound spirally around the shaft and affixed thereto, said tube having top apertures and bottom apertures spaced along it, the bottom apertures being offset lengthwise from the top apertures a distance more than the space between turns of the rod on the shaft, and means to rotate said shaft.

2. A spreader of the character described comprising a supporting vehicle, a hopper thereon, said hopper having downwardly converging side walls providing a long narrow opening at the hopper bottom, a dispensing tube having side flanges thereon overlapped with said side walls, said tube and flanges closing said opening, means removably securing said side flanges to said side walls, a shaft in said tube, a rod wound spirally around the shaft and affixed thereto, the shaft diameter being at least three times the rod diameter, said tube having top apertures and bottom apertures spaced along it, the bottom apertures being offset lengthwise from the top apertures a distance more than the space between turns of the rod on the shaft, and means to rotate said shaft, said supporting vehicle having a tow beam beneath the hopper and spaced therefrom upon which the tube drops when the tube side flanges are released from the hopper side walls.

3. A spreader of the character described comprising a supporting vehicle, a hopper thereon, said hopper having downwardly converging side walls providing a long narrow opening at the hopper bottom, a dispensing tube having side flanges thereon overlapped with said side walls, said tube and flanges closing said opening, the hopper side walls having latches on the outside immediately above the bottom opening engaging the tube side flanges and removably securing said side flanges to said side walls, a shaft in said tube, a rod wound spirally around the shaft and affixed thereto, the shaft diameter being at least three times the rod diameter, said tube having top apertures and bottom apertures spaced along it, the bottom apertures being offset lengthwise from the top apertures a distance more than the space between turns of the rod on the shaft, and means to rotate said shaft.

4. A spreader of the character described comprising a supporting vehicle, a hopper thereon, said hopper having downwardly converging side walls providing a long narrow opening at the hopper bottom, an agitator in the hopper above said opening, a dispensing tube having side flanges thereon overlapped with said side walls, said tube and flanges closing said opening, means removably securing said side flanges to said side walls, a shaft in said tube, a rod wound spirally around the shaft and affixed thereto, the shaft diameter being at least three times the rod diameter, said tube having top apertures and bottom apertures spaced along it, the bottom apertures being offset lengthwise from the top apertures a distance more than the space between turns of the rod on the shaft, a ground engaging wheel forming part of the supporting vehicle and drive means connecting the wheel to said shaft operable to drive the shaft and the agitator at a speed proportional to the wheel speed, said drive means comprising an axle for said wheel, a sprocket wheel on the axle, a pawl and tooth connecting the sprocket wheel to the ground engaging wheel, a sprocket chain driven by said sprocket wheel, a shaft for the agitator having a sprocket wheel driven by said sprocket chain, a shaft journalled on said hopper and extending the length thereof, a sprocket wheel non-rotatably secured on said last named shaft and driven by said sprocket chain, a sprocket wheel on the last named shaft at the other end of the hopper, a second sprocket chain driven by the last named sprocket wheel and a sprocket wheel non-rotatably secured on the shaft upon which the rod is wound and driven by the second sprocket chain.

References Cited in the file of this patent

UNITED STATES PATENTS

| | | |
|---|---|---|
| 2,522,693 | Stiteler | Sept. 19, 1950 |
| 2,569,421 | Larson | Sept. 25, 1951 |
| 2,684,785 | Waldorf et al. | July 27, 1954 |
| 2,717,104 | Hoppes | Sept. 6, 1955 |